United States Patent [19]

Kim et al.

[11] Patent Number: 5,787,024

[45] Date of Patent: Jul. 28, 1998

[54] HORIZONTAL FILTER IN MOVING PICTURE DECODING APPARATUS

[75] Inventors: Tae-Sung Kim, Seoul; Jong-Seon Kim, Suwon; In-Shig Shim, Songnam; Young-Wha Oh, Seoul, all of Rep. of Korea

[73] Assignee: Samsung Electronic Co., Ltd., Kyungki-do, Rep. of Korea

[21] Appl. No.: 760,297

[22] Filed: Dec. 4, 1996

[30] Foreign Application Priority Data

Dec. 6, 1995 [KR] Rep. of Korea ............... 1995-47222

[51] Int. Cl.⁶ .................................................. G06F 17/10
[52] U.S. Cl. .......................... 364/724.011; 364/724.16
[58] Field of Search ............................ 348/390, 396, 348/397, 398, 845.1, 580; 364/724.011, 724.04, 724.1, 724.12, 724.13, 724.16, 754.01, 757, 759

[56] References Cited

U.S. PATENT DOCUMENTS

| | | | |
|---|---|---|---|
| 4,791,597 | 12/1988 | Miron et al. | 364/724.03 |
| 5,287,299 | 2/1994 | Lin | 364/759 |
| 5,450,083 | 9/1995 | Brewer | 364/724.1 X |
| 5,461,582 | 10/1995 | Peng et al. | 364/724.16 |
| 5,668,746 | 9/1997 | Iwaki | 364/724.16 |

*Primary Examiner*—Chuong Dinh Ngo
*Attorney, Agent, or Firm*—Sughrue, Mion, Zinn, Macpeak & Seas, PLLC

[57] ABSTRACT

A horizontal filter used for converting a Moving Picture Experts Group (MPEG) source input format (SIF) picture to a CCIR 601 picture during decoding includes operating means for obtaining products by effectively multiplying an input picture signal with the coefficients 140 and −12, first selecting means for selectively outputting the values effectively multiplied by 140 and −12 obtained from the operating means in a sequence of the input picture signal, an accumulator for accumulating the signals output from the first selecting means, second selecting means for selectively outputting the input picture signal and signals output from the accumulator, and a controller for controlling the selection operation of the first and second selection means and the accumulation by the accumulator.

8 Claims, 2 Drawing Sheets

HORIZONTAL FILTER IN MOVING PICTURE DECODING APPARATUS

BACKGROUND OF THE INVENTION

1. Field of the Invention

The present invention relates to a horizontal filter used in a moving picture decoding apparatus, and more particularly, to a horizontal filter which is used for forming a Moving Picture Experts Group (MPEG) source input format (SIF) picture as a CCIR 601 picture during decoding.

2. Description of the Related Art

In general, in order to display a decoded MPEG-1 picture on a monitor, the decoded picture should be enlarged by a factor of two in order to be displayed on the monitor since the magnitude of the horizontal resolution of the decoded picture is less than a half that of the monitor. A linear interpolator is used to enlarge the picture by two. According to the MPEG-1 international standard, a zero value is interleaved between respective samples to convert a 352*240 pixel MPEG SIF picture into a 704*480 pixel CCIR 601 picture. In other words, assuming that the 352*240 pixel picture has a sequence in the order of $y_{n-3}$, $y_{n-2}$ and $y_{n-1}$, if 0 is interleaved between the respective samples, the picture signal has a sequence of $y_{n-3}$, 0, $y_{n-2}$, 0 and $y_{n-1}$. In this manner, the number of pixels are doubled, and then the moving picture decoding apparatus performs horizontal interpolation by using a linear phase finite impulse response (FIR) filter. When filtering is performed with respect to a Y signal using the FIR filter, filtering coefficients are defined as follows:

| −12 | 0 | 140 | 256 | 140 | 0 | −12 |
|---|---|---|---|---|---|---|

Therefore, assuming that horizontally adjacent Y samples are $y_{n-3}$, $y_{n-2}$, $y_{n-1}$, $y_n$, $y_{n+1}$, $y_{n+2}$ and $y_{n+3}$, the FIR filter satisfies the following equation (1).

$$O_n = (-12y_{n-3} + 140y_{n-1} + 256y_n + 140y_{n+1} - 12y_{n+3})/25 \quad (1)$$

In order to obtain the picture $O_n$ filtered as expressed in equation (1), a delay for delaying an input picture signal, a plurality of multipliers, and an adder for adding the multiplication results are necessary. A conventional linear phase FIR filter used for filtering according to equation (1) is shown in FIG. 1.

As shown in FIG. 1, the FIR filter for performing horizontal interpolation includes seven delays 100–106 for obtaining seven values from an input picture signal y, five multipliers 110–114 for multiplying the picture signal y output from the respective delays 100–106 with the filtering coefficients, an adder 120 for adding the outputs of the multipliers, and a shifter 130 for normalizing the sum output from adder 120 as a 256 value. That is, shifter 130 operates to divide the sum output from adder 120 by 256 to normalize the samples upon output to satisfy the same condition as upon input, regardless of whether the filter is an odd-numbered filter or an even numbered filter (e.g., −12+140+140−12=256 for an odd-numbered filter, and 0+256+0=256 for an even-numbered filter).

Here, since the filtering coefficients for the $y_{n-2}$ and $y_{n+2}$ samples have a value of zero, no multiplier is provided for those samples. In such a manner, the prior art horizontal filter used for performing horizontal interpolation includes a multitude of multipliers, which, requires much filtering processing time.

SUMMARY OF THE INVENTION

Accordingly, the present invention has been created in view of the problem occurring in the prior art. Hence, an object of the present invention is to provide a horizontal filter for efficiently operating a horizontal filtering during a horizontal interpolation operation performed when a moving picture decoding apparatus decodes an SIF picture as a CCIR 601 picture, in which the processing time of the present invention is faster than the processing time of the prior art horizontal filter.

To accomplish the above object, there is provided a horizontal filter comprising: operating means for obtaining first and second multiplied values by effectively multiplying first and second samples of an input picture signal with first and second predetermined values, respectively; first selecting means for selectively outputting as a first selected signal one of the first and second multiplied values obtained from the operating means based on a sequence of samples of the input picture signal; an accumulator for accumulating signals output from the first selecting means, and outputting an accumulated signal; second selecting means for selectively outputting the input picture signal and the accumulated signal; and a controller for controlling the first and second selection means and the accumulator to output the first and second selected signals and the accumulated signal, respectively, at a time based on the input picture signal.

BRIEF DESCRIPTION OF THE DRAWINGS

The above objects, other features and advantages of the present invention will become more apparent by describing in detail a preferred embodiment thereof with reference to the attached drawings, in which.

DETAILED DESCRIPTION OF THE PREFERRED EMBODIMENT

Figure 1:
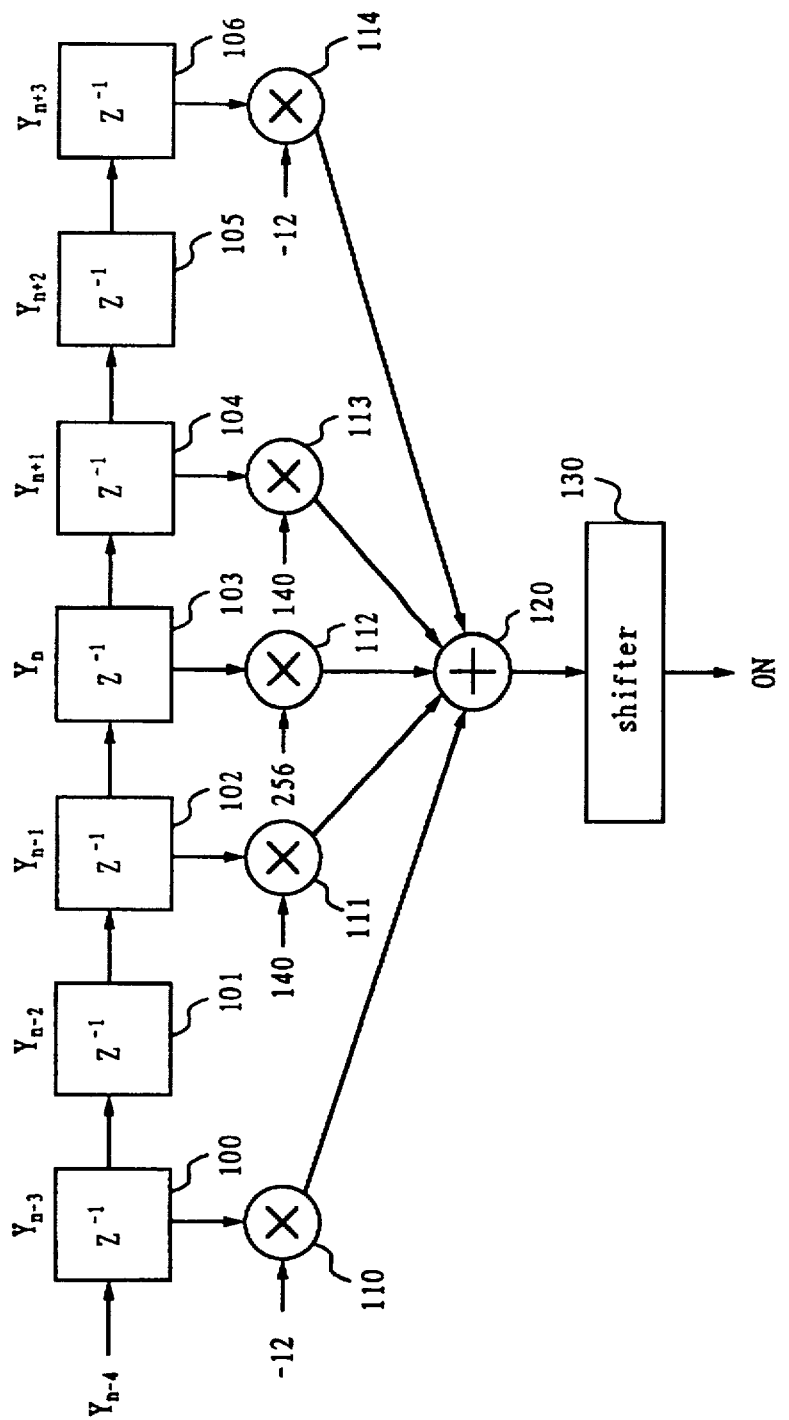
FIG. 1 is a block diagram of a horizontal filter used in a conventional moving picture decoding apparatus.
Figure 2:
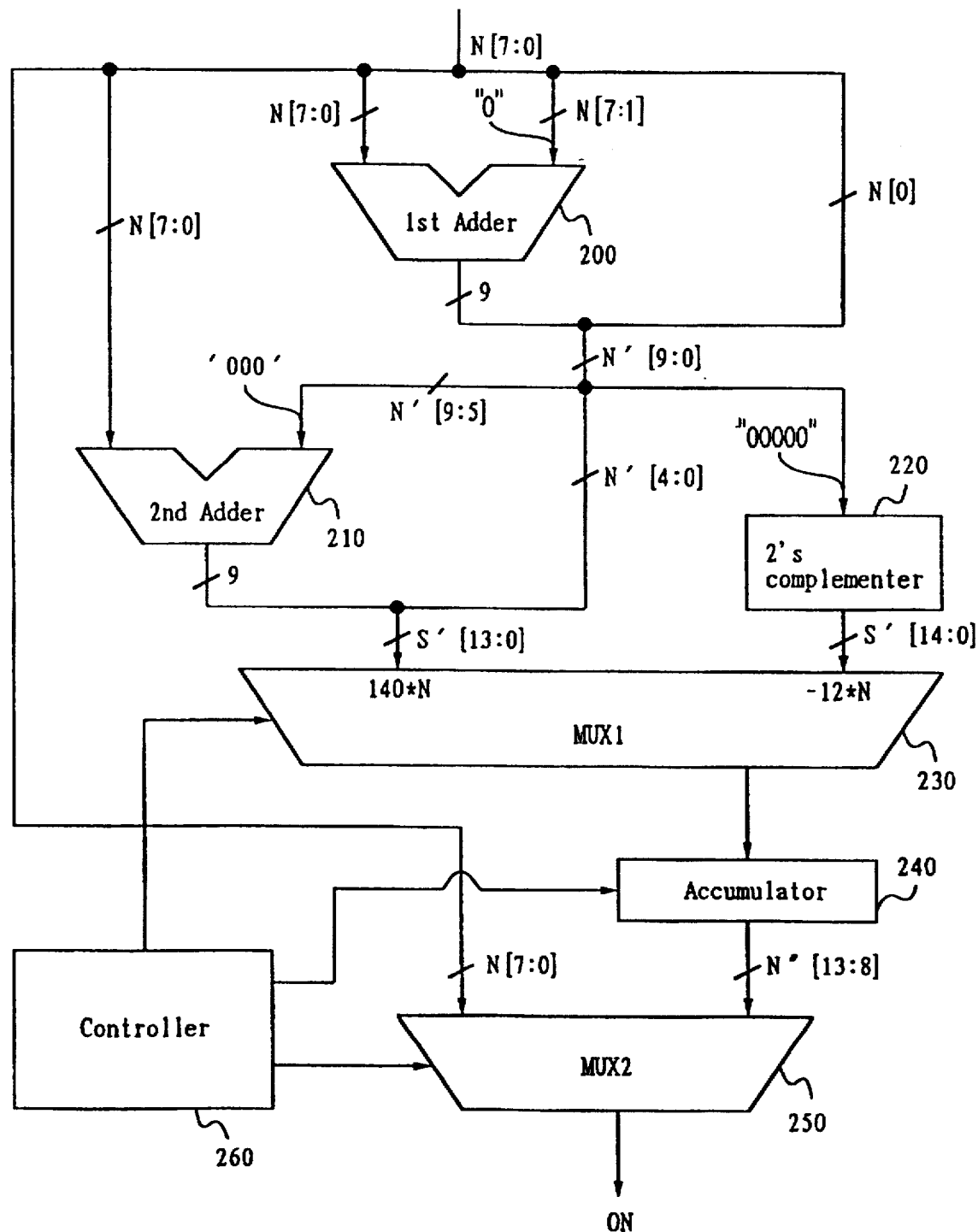
FIG. 2 is a block diagram of a horizontal filter used in a moving picture decoding apparatus in accordance with an embodiment of the present invention.

Referring to FIG. 2, the horizontal filter according to the present invention includes a first adder 200 for adding an input pixel data y expressed as 8-bit data N[7:0], and N[7:1] which is obtained by interleaving zero into the most significant bit of N[7:0], a second adder 210 for adding the N[7:0] input data and 8 bits of data obtained by interleaving '000' into the 3 most significant bits of the bits N'[9:5] among bits N'[9:0] output from first adder 200, a 2's complementer 220 for performing a 2's complement of the N'[9:0] bit data unit output from first adder 200, a first multiplexer 230 for selectively outputting one of the input data units S'[13:0] and S'[14:0], in which the S'[14:0] data unit is output from 2's complementer 220, and the S'[13:0] data unit is formed with the 9-bits of data output from second adder 210 set as the most significant bits and the N'[4:0] bits, among the N'[9:0] bits output from first adder 200, set as the lowest significant bits, an accumulator 240 for accumulating values output from first multiplexer 230, a second multiplexer 250 for selecting between the 8-bit input picture data N[7:0] and a data unit N"[13:8] output from accumulator 240 and outputting the selected value as a final output, and a controller 260 for controlling the operation of first multiplexer 230, accumulator 240 and second multiplexer 250. Here, first adder 200, second adder 210 and 2's complementer 220 are used as the processing means for operating on the values obtained by multiplying the input picture signal with the coefficients 140 and −12.

The horizontal filter configured as described above operates as follows.

An input picture signal expressed as N[7:0] is applied to first adder 200, second adder 210, and second multiplexer 250, respectively.

The first adder 200 adds the input data N[7:0] applied to a first input port and N[7:1], with 0 set in its upper significant bit, applied to a second input port. The first adder 200 outputs the sum consisting of 9 bits which contains a carry bit. The 9 bits of data output from first adder 200 forms a N'[9:0] bit data unit together with the input data N[0] to then be transmitted. Among the transmitted N'[9:0] bit data unit, the N'[9:5] bits of data are transmitted to second adder 210.

The second adder 210 adds the N[7:0] bit data of the input picture signal applied to the second input port and 8-bit data with '000' set as the most significant bits coupled with the N'[9:5] bit data. The result of the addition operation performed by the second adder 210 is output as a 9-bit data unit containing a carry bit. The thus-output 9 bit data unit is combined with the N'[4:0] data unit to form a 14-bit data unit S'[13:0] with N'[4:0] set as the lowest significant bits, in which N'[4:0] are the bits not applied to second adder 210 among the N'[9:0] bit data unit. The 14-bit data unit S'[13:0] is then transmitted to the first input port of first multiplexer 230. At this time, the S'[13:0] bit data unit applied to first multiplexer 230 has a value of 140*N[7:0]. Here, the value of 140*N is obtained utilizing the fact that the value of 140*N is expressed as N*010000000+N*1000+N*100.

Also, the N'[9:0] bit data unit can be transmitted to 2's complementer 220. The 2's complementer 220 performs a 2's complement operation to obtain a negative value when a signal having bit values '00000' is applied as the most significant bits to the N'[9:0] data unit. The 15-bit data comprising the S'[14:0] data unit output as a result of 2's complement processing is transmitted to the second input port of first multiplexer 230. Here, the thus-output S'[14:0] data unit has a value of −12*N[7:0]. The value −12*N[7:0] can be expressed as −(N*12), which can be also expressed as the value N*1000+N*100. Thus, using such a relationship, the value of −12*N can be obtained.

Here, only the samples 140*N and −12*N are filtered with respect to the input 8-bit picture signal using first adder 200, second adder 210 and 2's complementer 220. If an equation for a general digital filter is expressed by the following equation (2)

$$O_n = \sum_{k=-N}^{N} y_{n-k} * C_k \quad (2)$$

where $O_n$ is the n'th output, $y_{n-k}$ is the n−k'th input, and $C_k$ is the k'th coefficient. If n is an even number, the n'th output $O_n$ is calculated according to the following equation (3). If n is an odd number, the n'th output $O_n$ is calculated according to the following equation (4).

$$O_n = -12y_{n-3} + 140y_{n-1} - 12y_{n+3} \quad (3)$$

$$O_n = y_n \quad (4)$$

Therefore, only the values of 140*N and −12*N are used for the value of $O_n$ where n is an even number. The data units S'[13:0] and S'[14:0] are detected for all input picture signals, and are supplied to first multiplexer 230, which is, however, controlled by controller 260 so that only the values multiplied with the input picture signals of the sequence expressed in equation (3) are selectively output. Here, the output signal of first multiplexer 230 is transmitted to accumulator 240.

The accumulator 240 accumulates the values output from first multiplexer 230. Specifically, the accumulator 240, controlled by controller 260, accumulates the signals supplied from first multiplexer 230 so that $O_n$ is output according to equation (3) and is normalized for the 256 value, and accumulator 240 outputs a value N"[13:8] of 8 bits. The output value of N"[13:8] is transmitted to second multiplexer 250.

The second multiplexer 250 selectively outputs the N[7:0] bit picture signals applied to first and second adders 200 and 210 and the N"[13:8] bit signal transmitted from accumulator 240. The second multiplexer 250 is controlled by controller 260 and selectively outputs the above signals. Here, during the selection, the value $O_n$ is determined depending on whether or not the value n is an even number or an odd number. In other words, if n is an odd number, since the final output value $O_n$ of the horizontal filter is expressed according to equation (4), the horizontal filter operates to select the input data N[7:0]. If n is an even number, the horizontal filter operates to select the data N"[13:8] obtained according to equation (3) as the final output value $O_n$ thereof.

As described above, according to the present invention, in a moving picture decoding apparatus, a horizontal filter used for horizontal interpolation when an SIF picture is decoded as a CCIR 601 picture is implemented without using a multiplier, thereby reducing filtering time, which correspondingly reduces the decoding processing time.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A horizontal filter in a moving picture decoding apparatus comprising:

operating means for obtaining multiplied values by multiplying an input picture signal with 140 and with −12;

first selecting means for selectively outputting said multiplied values obtained from said operating means in a sequence of said input picture signal;

an accumulator for accumulating signals outputted from said first selecting means;

second selecting means for selectively outputting said input picture signal and signals outputted from said accumulator; and a controller for controlling an output time of said first and second selection means and said accumulator.

2. A horizontal filter in a moving picture decoding apparatus as claimed in claim 1, wherein said operating means comprises:

a first adder for adding said input picture signal expressed as 8-bit data N[7:0] and the N[7:1] data in which 0 is interleaved into its upper significant bit;

a second adder for adding said 8-bit N[7:0] data and bits N'[9:5] among bits N'[9:0], in which '000' is interleaved into the upper 3 significant bits, outputted from said first adder;

transmission means for transmitting a product of said input picture signal and 140, with 9-bit data added and outputted from said second adder being set as the upper significant bit and the N'[4:0] among said N'[9:0] bits being set as the lower significant bit; and a 2's complementer for 2's complement-processing input data by interleaving 0000 into the upper significant bit of N'[9:0] bits output from said first adder and outputting a product of said input picture and −12.

3. A horizontal filter in a moving picture decoding apparatus as claimed in claim 2, wherein said first selecting means includes a multiplexer for selectively outputting products of said input picture signal with 140 and −12.

4. A horizontal filter in a moving picture decoding apparatus as claimed in claim 1, wherein said controller control the selection of said second selecting means depending whether said N value is an odd number or an even number.

5. A horizontal filter in a moving picture decoding apparatus as claimed in claim 1, wherein said accumulator accumulates the signal output from said first selecting means and then normalizes the accumulated result as a 256 value.

6. A horizontal filter in a moving picture decoding apparatus as claimed in claim 5, wherein said second selecting means includes a multiplexer for selectively outputting said input picture signal and the signal output from said accumulator.

7. A horizontal filter in a moving picture decoding apparatus as claimed in claim 1, wherein said first selecting means includes a multiplexer for selectively outputting a product of said input picture signal with 140 and −12.

8. A horizontal filter in a moving picture decoding apparatus as claimed in claim 1, wherein said second selecting means includes a multiplexer for selectively outputting said input picture signal and the signal output from said accumulator.

* * * * *